Jan. 12, 1960 P. ARBEIT 2,921,106
METHOD OF AND APPARATUS FOR MAKING GLASS
Filed Feb. 11, 1953 2 Sheets-Sheet 1

INVENTOR.
PIERRE ARBEIT
BY
Dale A. Bauer
ATTORNEY

Jan. 12, 1960    P. ARBEIT    2,921,106
METHOD OF AND APPARATUS FOR MAKING GLASS
Filed Feb. 11, 1953    2 Sheets-Sheet 2

INVENTOR.
PIERRE ARBEIT
BY
Bauer and Seymour
ATTORNEYS

United States Patent Office 2,921,106
Patented Jan. 12, 1960

2,921,106

METHOD OF AND APPARATUS FOR MAKING GLASS

Pierre Arbeit, Paris, France, assignor to Societe Anonyme des Manufactures des Glaces et Produits Chimiques de Saint-Gobain, Chauny & Cirey, Paris, France Application February 11, 1953, Serial No. 336,416

Claims priority, application France February 11, 1952

10 Claims. (Cl. 13—6)

This invention relates to furnaces for the manufacture of glass or analogous materials which are capable of being heated by Joule effect by the passage of electric current through the mass. Joule effect has found its widest use in the manufacture of glass and the invention will be described in connection with that manufacture.

In the manufacture of glass, the heating of the raw material, the crude glass, and the fine glass, is accomplished totally or in part by the passage through the glass, in its molten state, of an electric current which is introduced by means of electrodes immersed in the glass. This invention is more particularly concerned with a new process and with novel furnaces for the continuous process of making glass, in which the raw materials are admitted to an elongated tank at one extremity and the finished glass is withdrawn at the other end, the material being subjected successively to the operations of fusion, fining and conditioning or working during its movement from one end of the furnace to the other.

It is known that the fusion or melting of the glass, the fining and the homogenization are facilitated and accelerated by the movements of the glass produced in the several sections or zones of the furnace. However, up to the present, in glass furnaces, particularly in continuous furnaces, the heating of the glass has been distributed practically symmetrically with respect to a vertical plane passing through the longitudinal axis of the furnace from whence it follows that the convection currents set up in the glass are also symmetrically located with respect to this longitudinally extending plane.

It is my discovery that an improvement in the continuous process of making glass can be realized by generating convection currents of glass which are unsymmetrical with respect to the said longitudinal plane. It is also a part of this invention to construct novel apparatus capable of generating such unbalanced or unsymmetrical currents by Joule effect.

It is an object of this invention to establish, in any desired zone of the bath contained in the tank or tanks constituting the furnace, or in compartments or cells of the furnace, convection currents extending transversely to the direction of flow of the glass along the furnace, by applying heat unsymmetrically with respect to a vertical plane containing the longitudinal axis of the tank. The process according to the invention, in its preferred form, consists in generating heat by the passage of an electric current through the glass bath, the current being introduced by electrodes that enter through the lateral walls and extend into the glass less than half of the width of the furnace, the electrodes being either disposed on a single side of the furnace or disposed unsymmetrically on opposite sides of the said plane. The preferred manner of unsymmetrical disposition is to have more electrodes on one side than on the other, but this unsymmetricality may also be of position. In this way the zone or zones of heating produced on one side of the median plane produces a different effect upon the glass than the electrode or electrodes on the other side of the plane. Thus, the zones of heating produced on one side of the median plane are different in intensity or in position from the heated zones produced on the other side of the said plane.

In accordance with the invention, it is possible to use two or several electrodes which exchange current between them and which enter through the same longitudinal wall of the tank, thus creating one or more zones of heating disposed on the same side of the said vertical plane, without providing electrodes extending through the opposite wall of the tank. However, it is equally possible to introduce other electrodes at the opposite wall, which exchange current among themselves, or in the alternative, the unsymmetrical principle being maintained, permissibly exchanging current with the first group across the width of the tank.

The electrodes which enter through one wall may be directed at different angles to that wall and are not necessarily parallel to each other. They may be placed at the same depth or at different depths, the depth of individual electrodes being arranged more or less deep in the glass.

It may be particularly advantageous to disposed two neighboring electrodes so that they enter through a single wall of the tank parallel to each other in a vertical plane, but to one side of the said plane through the axis. If desired, a third electrode may be electrically associated with these electrodes, but disposed on the opposite side of the central plane and which is not necessarily vertically aligned or at the same distance from the end of the furnace as either of the first two electrodes.

All the electrodes in one unbalanced group may be supplied from a single source of power, for instance, where three electrodes are involved, they may be supplied by three phase current, but different groups of electrodes may be supplied from different sources, if desired.

The unbalanced electrode groupings of this invention may be used in a single compartment in which both melting and fining take place, or they may be localized in individual melting or fining compartments. They may also be used in one or more of the fining cells that are supplied with crude glass by a single melting tank, these cells themselves discharging to one or more working or discharging compartments.

The electrodes arranged in conformity with the invention may be associated with conductive bodies submerged in the bath of glass but not connected to a source of current, called idler electrodes, which act to direct the lines of current through the bath in any unsymmetrical lines desired.

The invention can be used in furnaces heated entirely by Joule effect and just as well in furnaces heated by a source of heat situated above the surface of the glass, for instance, flames or heating resistances.

In the accompanying drawing, which is schematic:

Fig. 1 is a fragmentary horizontal section of one form of furnace taken on the line 1—1 of Fig. 1a.

Fig. 2 is a horizontal section through a second form of the invention taken on the line 2—2 of Fig. 2a.

Fig. 3 is a horizontal section through a third form of the furnace taken on the line 3—3 of Fig. 3a.

Figure 1:
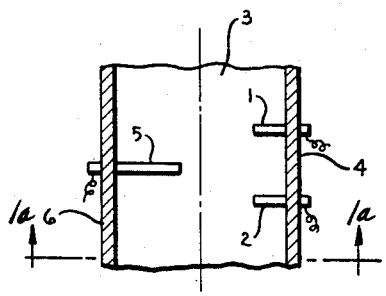

It should be understood that the various forms of the invention shown in the drawings are exemplary and do not limit the generality of what is elsewhere stated herein. In these figures only a small part of the furnaces have been shown and it should be understood that those parts may be melting zones, fining zones or conditioning zones, or separate cells.

Figure 1A:
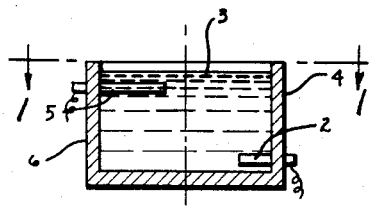
Fig. 1a is a vertical section of the same furnace taken on the line 1a—1a of Fig. 1.

In Figs. 1 and 1a the furnace has been provided on one side with two electrodes 1 and 2 which enter the bath 3 through the wall 4. The electrodes are in the same horizontal plane, close to the bottom wall or sole of the furnace. On the other side of the vertical plane extending through the longitudinal axis, and indicated by the broken line, is an electrode 5 which enters the glass through the opposite wall 6 at a different level. The principles of the invention would be maintained if all three electrodes were on the same level. The arrangement shown is preferably served by a three phase current from a single source.

Figure 2:
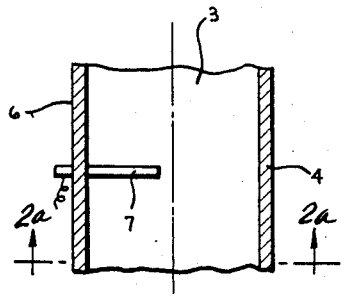
Figure 2A:
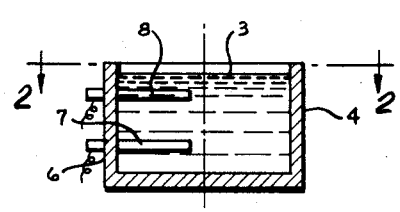
Fig. 2a is a vertical cross section on the line 2a—2a of Fig. 2.

In Figs. 2 and 2a, two electrodes 7 and 8 are admitted through longitudinal wall 6 of the tank in the same vertical plane. As shown, only two electrodes are involved but it is equally possible to use more electrodes in the same wall or to admit an unequal number of electrodes through the opposite wall.

It may also be possible to admit two other electrodes through the opposite wall provided at a level different from that of the electrodes 7 and 8 or even at the same level but of different dimensions and/or supplied with a different quantity of electrical energy.

Figure 3:
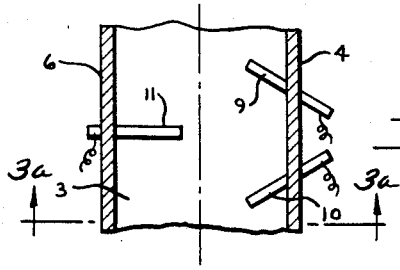
Figure 3B:
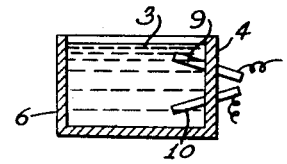
Fig. 3b is a similar vertical cross section of a modified form of furnace.
Figure 3A:
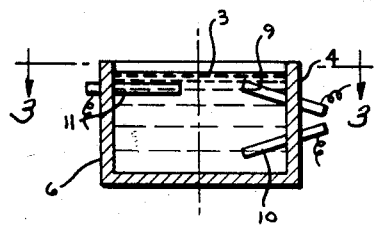
Fig. 3a is a vertical cross section taken on the line 3a—3a of Fig. 4.

In the form of the invention shown in Figs. 3 and 3a, all electrodes are at different levels and extend in different directions both vertically and horizontally. Electrodes 9 and 10 enter through the wall 4 and are disposed obliquely to one another, both vertically and horizontally. They are oblique with respect to the central vertical plane passing through the longitudinal axis of the tank and with respect to the horizontal. They may be associated, as shown, or not, with an electrode 11 which is admitted through the opposite wall 6. See Figs. 3a, 3b.

The electrodes have all been shown as extending through the lateral walls into the bath but they may equally well be admitted vertically.

The unbalance generated by the unsymmetrical arrangement of electrodes with respect to the center line of the furnace may be increased by furnishing certain groups of electrodes with greater power than other groups.

The invention comprehends an improvement in processes and furnaces for making glass and similar materials wherein the glass or the like is continuously produced which involves electrodes immersed in the glass for Joule effect heating which provide that the electrodes enter through a portion of the walls on one side or the other of the center line of the furnace and do not extend across that line, the said electrodes being disposed either on a single side of the tank with respect to its center line or are divided unsymmetrically on opposite sides of the center line so that one or more zones of heat produced on one side of the center line are different in intensity or in position from the zones of heat produced on the other side of the center line.

The invention also involves the new process which generates unsymmetrical, or unbalanced convection currents in the glass, being unsymmetrical with respect to the center line.

The invention also includes the following concepts taken alone or in various combinations.

(A) Two or more electrodes enter the glass through one longitudinal wall of the tank;

(B) These electrodes are disposed in a single vertical plane;

(C) They may be associated with one or more electrodes unsymmetrically disposed and entering through the opposite wall.

As shown in the drawing, the unsymmetrical principle may be emphasized by providing electrodes on one side which are different in size or shape, for instance, being shorter and of less diameter than the electrodes on the other side. This device enables one to attain a greater power density in the neighborhood of the electrodes on one side than on the other and thus to increase the unbalance of power of heat generated by the power, and as a result, to generate convection currents of much greater violence on one side than on the other.

Figure 4:
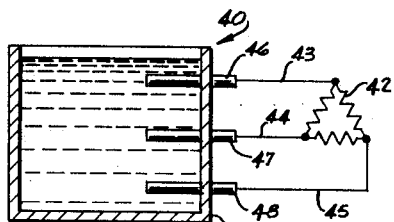
Fig. 4 is a diagrammatic, vertical sectional view through a furnace according to a modification.

In the modified form of the invention shown in Fig. 4, the numeral 40 refers to the tank of the furnace along which the glass flows; 41 is one side wall of that furnace; 42 is a source of three-phase electric current; 43, 44, 45 are connections from the source of three-phase current to electrodes 46, 47, and 48. The electrodes are all submerged in the glass and may be of the same size, arranged in a line or arranged at the apexes of a geometric figure. They work more strongly on one side of the center line than the other and, consequently, generate convection currents, on that side, which are not counter-balanced by equal currents on the opposite side. As a result of this, and the other arrangements which have been shown in this case, the glass in the furnace is provided not only with longitudinal motion, but with transversely extending currents which tend to mix the glass on one side of the flowing stream with that on the other side, thus tending to homogenize the glass.

Figure 5:
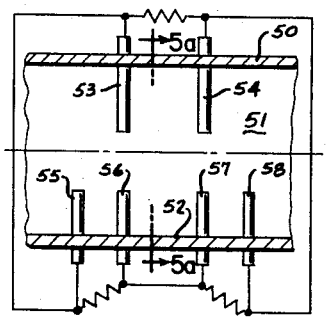
Fig. 5 is a horizontal sectional view through another modified form of the invention.
Figure 5A:
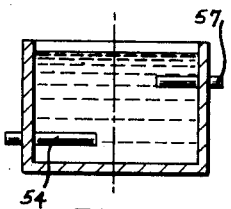
Fig. 5a is a section on the line 5a—5a of Fig. 5.

In Fig. 5, 50 refers to the side wall of a furnace along which flows a stream of glass 51, the other side being designated 52. Extending horizontally through the wall 50 are two electrodes 53, 54, which are shown to be of like dimensions. Through the opposite wall 52, extend electrodes 55, 56, 57, and 58 as shown in the sketch; the electrodes 55, 56, 57, and 58 are of smaller diameter than electrodes 53, 54 and they do not extend as far into the bath as do electrodes 53, 54. The electrodes are supplied by three-phase current, electrodes 54, 58 carrying the first phase; electrodes 56, 57, carrying the second phase; and electrodes 53, 55 carrying the third phase. Electrodes 55 to 58 extend over a greater length of the stream than do electrodes 53, 54. As shown in Figs. 5a, electrodes 55 to 58 are at a higher level than electrodes 53, 54. These figures illustrate several of the modifications set forth in the specification.

Figure 6:
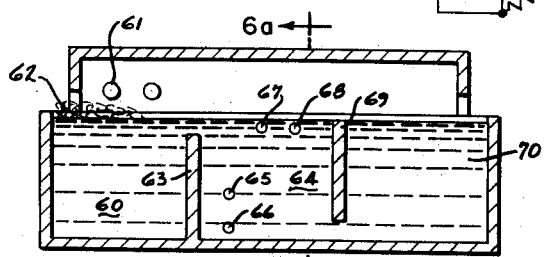
Fig. 6 is a vertical longitudinal section through a glass furnace embodying a modified form of the invention.
Figure 6A:
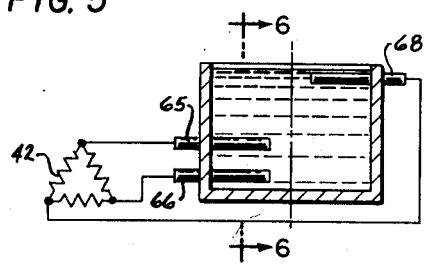
Fig. 6a is a section on line 6a—6a of Fig. 6.

Fig. 6 is a vertical, longitudinal section through a furnace which is divided into melting zone 60, which is heated by flame from burners 61, and supplied with raw materials through dog-house 62, the glass flowing over wall 63 into fining zone 64 in which two horizontal electrodes 65, 66, one at the middle and the other near the bottom of the zone, are placed relatively close to the wall 63 and carry two phases of the current as shown in Fig. 6a. Extending into the furnace through the opposite wall, and at a higher level in the glass are electrodes 67, 68; all these electrodes are shown to be of the same diameter, but the electrodes 67, 68 extend a lesser distance into the bath than do the electrodes 65 and 66. In this type of furnace, the relatively cool, crude glass flows over the wall 63 into fining compartment 64 where it undergoes fining by the electrodes and thereafter passes under the bridge wall 69 into the working and conditioning compartment 70.

Figure 7:
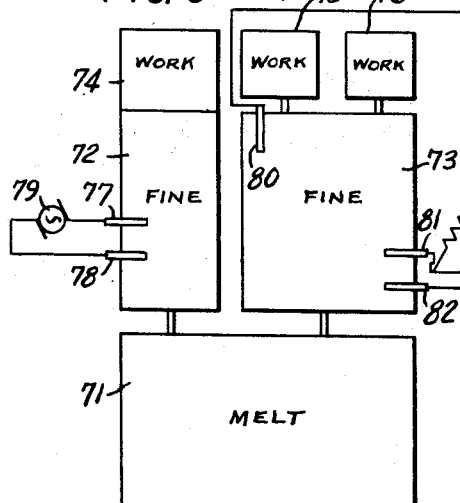
Fig. 7 is a diagrammatic plan view of another modified form of the invention.

Fig. 7 is a diagrammatic view in which a single melting compartment 71 supplies a plurality of fining compartments 72, 73, fining compartment 72 supplies a single working compartment 74, and fining compartment 73 supplies a plurality of working compartments 75, 76. The electrodes 77, 78 are supplied by a mono-phase source of electric current 79. The fining compartment 73 is supplied from a three-phase source 42, and electrodes 80, 81, and 82, which enter the compartment in different locations, the principle of unbalance being maintained.

Figure 8:
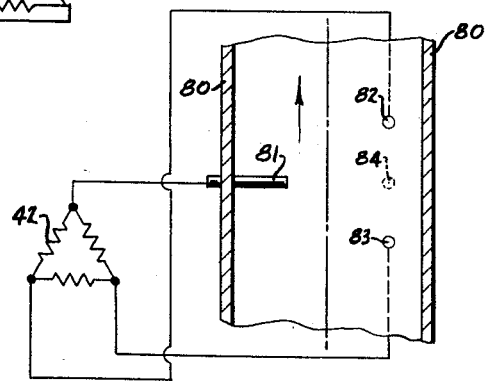
Fig. 8 is a horizontal section through a glass furnace showing a further modified form of the invention.

In Fig. 8, the numerals 80 indicate the side walls of a glass furnace along which flows glass in the direction indicated by the arrow. In this figure, a single electrode 81 extends horizontally through the left side wall and two vertical electrodes 82, 83 extend upward into the glass on the other side of the channel. These three electrodes are supplied by a source of tri-phase current 42. Between the electrodes 82, 83 is an idler electrode 84 which consists essentially of an electrode, extending upward from the bottom of the furnace, which is not connected to any source of current but which serves to receive and to concentrate the current emitted from electrodes 82 and 83 and to confine it to a path indicated by the line of the three electrodes 82, 84, 83. Thus, two of the phases are on one side of the furnace and one is on the other side, and the principle of thermal unbalance is maintained.

Figure 9:
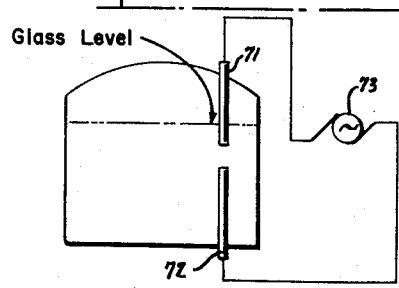
Fig. 9 is a vertical sectional view through a glass furnace showing yet another modification of the invention.

In Fig. 9 there is shown in diagrammatic, vertical cross section a furnace in which a pair of electrodes are admitted vertically to one side of the longitudinal center line of a furnace. The electrodes are served by a monophase alternating current source. Electrode 71 is admitted through the top of the furnace, and electrode 72 is admitted through the bottom of the furnace. These electrodes are supplied by alternating current source 73. Both electrodes might enter from above, or both might enter from below, but maintaining the principle of transverse thermal unbalance.

A particular advantage of this invention lies in the production of a more homogeneous and more uniform glass.

As many apparently widely different embodiments of the present invention may be made without departing from the spirit and scope thereof, it is to be understood that the invention is not limited to the specific embodiments.

What is claimed is:

1. A continuous flow glass furnace having a channel along which a stream of glass flows horizontally, submerged heating means for the glass in the channel, and means for generating in the heating means on one side of the center of the channel an intensity of heat sufficient to establish a convection current of glass which moves across the stream and mingles glass from opposite sides of the center thereof.

2. A continuous flow glass furnace having a channel along which glass flows horizontally, and heating means for the glass in said channel essentially consisting of electrode-heating means of a size insufficient to extend materially beyond the center of the said channel extending into the glass on one side of the center of the channel, the part of the channel opposite said electrodes having electrode-heating means of heating capacity disproportionate to that of said electrode-heating means, and so limited in extent as not to extend materially beyond the center of the channel, the disproportion in the capacity of said electrodes being so substantial that when energized they generate a transverse convection current which flows across the stream and mingles glass from opposite sides of the center thereof.

3. A method of making homogeneous glass that comprises mixing and stirring molten glass as it flows along in a stream by internally heating said stream by Joule effect at one side of the center line thereof, at a fixed position past which the stream flows, to a temperature sufficiently high to generate in the stream a convection current capable of moving across the stream and mingling the glass from opposite sides of the center thereof.

4. A method of making homogeneous glass that comprises flowing molten glass in a stream, heating the glass by passing an electric current through it and passing more of said electric current through the glass on one side of the center of the stream than through the glass on the opposite side of the center thereof, the difference in intensity of the said heating generating in said stream on one side thereof a convection current of glass which moves across the furnace and mingles its glass with that on the other side of the stream.

5. The method of making glass that comprises flowing the glass mass along a path and subjecting it along said path to the steps of melting, and fining to completion by means comprising the introduction of electric heating current to the glass at a place along said path, introducing said electric current with different intensity on opposite sides of a central upright plane extending longitudinally downstream, the difference in intensity of the heating generating in said stream on one side thereof a transverse glass current which moves across said plane to mingle with the glass on the other side.

6. In a continuous flow glass furnace having a channel along which the glass flows during its transformation from raw material to finished product, means for generating a cross current of glass comprising heating means immersed in the glass on, and heating a material length of the glass flowing along, one side of the channel, said means being materially greater in its heat generating effect than any heat generating means immersed in a similar length of glass on the opposite side of the channel, any heat generating means in the glass on said opposite side being limited so as not to extend materially beyond its own side, the heating means on said one side of the channel being of such intensity that it, when energized, generates a transverse glass current that mingles the glass from opposite sides of the center of the tank.

7. The method of producing fined glass that comprises melting the batch, flowing the molten glass along a channel as a stream, subjecting the said flowing stream to heat treatment capable of producing a completely fined glass, and generating in one side of said stream of glass, as it undergoes the said heat treatment, a vertical current of glass of sufficient intensity to move glass from the said side laterally across the center of the stream to mingle with the glass on the other side, whereby a vertical and lateral mingling of the glass occurs in the flowing stream during the preparation of the fined glass.

8. A furnace for the manufacture of molten materials such as glass in which the molten material flows from one extremity to the other of the furnace and which includes a tank along which the material flows, electrodes immersed in material flowing through the tank, means to pass electric current of heating intensity through the flowing material between the electrodes, said electrodes in at least one zone of the furnace being unsymmetrically arranged with respect to a longitudinal axis extending in the direction of flow, a plurality of said electrodes being situated on the same side of the said axis and extending through a wall thereof into the flowing material, all the electrodes in the said zone being restricted in extent to a single side of the said axis and being so arranged that the amount of heat generated on one side of the axis is materially greater than the amount of heat generated on the other side of the axis by an amount sufficient to generate a transverse convection current which mingles the glass from opposite sides of the center of the tank.

9. A furnace according to claim 1 in which there are submerged heating means on both sides of the center line of the channel and the heating means on one side of the center line are more deeply submerged than those on the other side.

10. A furnace according to claim 1 in which the heating means on one side of the center line comprises vertical type heating means.

References Cited in the file of this patent

UNITED STATES PATENTS

| | | |
|---|---|---|
| 2,039,853 | Stenhouse | May 5, 1936 |
| 2,360,373 | Tiede | Oct. 17, 1944 |
| 2,467,809 | Cannon et al. | Apr. 19, 1949 |
| 2,552,395 | Borel et al. | May 8, 1951 |
| 2,586,079 | Peiler | Feb. 19, 1952 |
| 2,591,708 | Lubatti | Apr. 8, 1952 |
| 2,659,764 | Konig | Nov. 17, 1953 |

FOREIGN PATENTS

| | | |
|---|---|---|
| 597,838 | Great Britain | Feb. 4, 1948 |